(12) United States Patent
Chavan Dafle et al.

(10) Patent No.: US 11,247,345 B2
(45) Date of Patent: Feb. 15, 2022

(54) SHAPE-SHIFTING FINGERS FOR ROBOTIC GRIPPERS

(71) Applicant: Massachusetts Institute of Technology, Cambridge, MA (US)

(72) Inventors: Nikhil Chavan Dafle, Cambridge, MA (US); Alberto Rodriguez Garcia, Cambridge, MA (US); Kyubin Lee, Seattle, WA (US)

(73) Assignee: Massachusetts Institute of Technology, Cambridge, MA (US)

( * ) Notice: Subject to any disclaimer, the term of this patent is extended or adjusted under 35 U.S.C. 154(b) by 226 days.

(21) Appl. No.: 16/542,754

(22) Filed: Aug. 16, 2019

(65) Prior Publication Data
US 2020/0055197 A1     Feb. 20, 2020

Related U.S. Application Data

(60) Provisional application No. 62/785,285, filed on Aug. 20, 2018.

(51) Int. Cl.
*B25J 15/00*     (2006.01)
*B25J 15/08*     (2006.01)

(52) U.S. Cl.
CPC ....... *B25J 15/0028* (2013.01); *B25J 15/0004* (2013.01); *B25J 15/0023* (2013.01); *B25J 15/0042* (2013.01); *B25J 15/08* (2013.01)

(58) Field of Classification Search
CPC .... B25J 15/0028; B25J 15/0004; B25J 15/08; B25J 15/0042; B25J 15/0023

(Continued)

(56) References Cited

U.S. PATENT DOCUMENTS

| 2,589,101 A | * | 3/1952 | Leguillon | ............... B66F 9/188 |
| | | | | 414/619 |
| 3,056,625 A | * | 10/1962 | Timmerman | ............. B66C 1/46 |
| | | | | 294/106 |

(Continued)

OTHER PUBLICATIONS

International Search Report and Written Opinion for International Application No. PCT/US2019/046768 dated Nov. 5, 2019.

(Continued)

*Primary Examiner* — Paul T Chin
(74) *Attorney, Agent, or Firm* — Wolf, Greenfield & Sacks, P.C.

(57) ABSTRACT

Shape-shifting fingers may enable parallel-jaw gripper to re-grasp objects. In some embodiments, a gripper includes two fingers each having a flexible membrane which is moveable between an extended state and a retracted state in response to pressure applied to a cavity at least partially formed by the membrane. In the extended and retracted state the shape of the flexible membrane may change based on the pressure and/or a force applied to the membrane and may attain two distinct geometric forms to facilitate distinct manipulation functionalities. In some embodiments, the flexible membrane switches between a wedge-shaped geometry in the extended state and a V-shaped geometry in the retracted state. The wedge-shaped geometry may provide a point contact on a cylindrical object so that the object may pivot to a vertical position under the effect of gravity. The V-shaped geometry may localize the object in a vertical position and securely hold it.

29 Claims, 11 Drawing Sheets

(58) Field of Classification Search
USPC .................................................. 294/119.3
See application file for complete search history.

(56) References Cited

U.S. PATENT DOCUMENTS

| | | | | |
|---|---|---|---|---|
| 3,601,442 | A * | 8/1971 | Orndorff | B66C 1/46 |
| | | | | 294/119.3 |
| 3,640,564 | A * | 2/1972 | Kuster | F16C 1/10 |
| | | | | 294/119.3 |
| 4,740,025 | A * | 4/1988 | Nelson | B01L 9/50 |
| | | | | 294/902 |
| 4,928,926 | A * | 5/1990 | Bloemendal | B66F 13/005 |
| | | | | 254/93 R |
| 5,090,758 | A | 2/1992 | Lord | |
| 5,245,885 | A * | 9/1993 | Robertson | B25J 15/0009 |
| | | | | 294/119.3 |
| 5,403,056 | A | 4/1995 | Wallace | |
| 5,518,231 | A * | 5/1996 | Reddy | B65H 5/085 |
| | | | | 271/204 |
| 5,871,248 | A * | 2/1999 | Okogbaa | B25J 15/00 |
| | | | | 294/86.4 |
| 7,654,595 | B2 * | 2/2010 | Yokoyama | B25J 9/142 |
| | | | | 294/99.1 |
| 9,808,936 | B2 | 11/2017 | Chavan Dafle et al. | |
| 2006/0028041 | A1 * | 2/2006 | Ono | B25J 15/10 |
| | | | | 294/119.3 |
| 2016/0075036 | A1 * | 3/2016 | Lessing | B25J 15/0023 |
| | | | | 361/234 |
| 2016/0375590 | A1 | 12/2016 | Lessing et al. | |
| 2017/0036354 | A1 | 2/2017 | Chavan Dafle et al. | |
| 2017/0072572 | A1 | 3/2017 | Wagner et al. | |

OTHER PUBLICATIONS

Deimel et al., A novel type of compliant and underactuated robotic hand for dexterous grasping. The International Journal of Robotics Research. Jan. 2016;35(1-3):161-85.
Rus et al., Design, fabrication and control of soft robots. Nature. May 28, 2015;521(7553):467-475.
PCT/US2019/046768, Nov. 5, 2019, International Search Report and Written Opinion.
Chavan Dafle et al., A two-phase gripper to reorient and grasp. In 2015 IEEE International Conference on Automation Science and Engineering (CASE) Aug. 24, 2015:1249-1255.

* cited by examiner

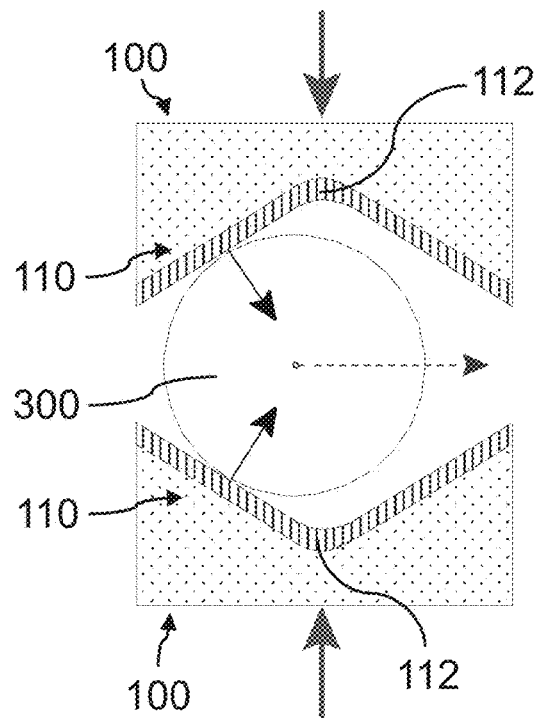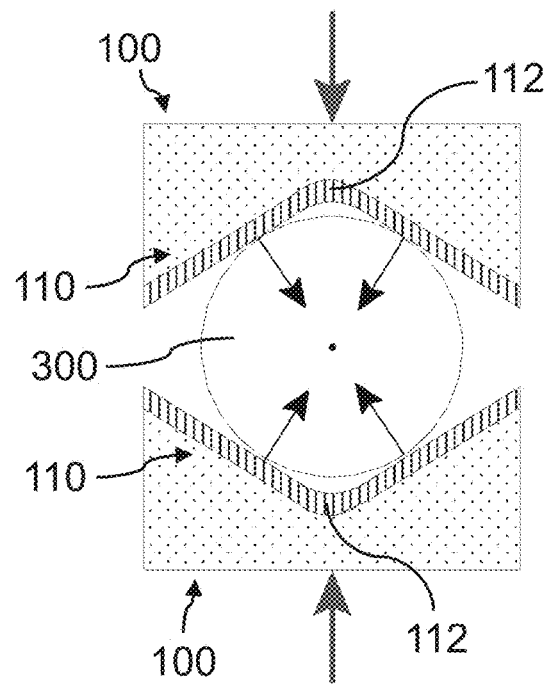
FIG. 7A  FIG. 7B
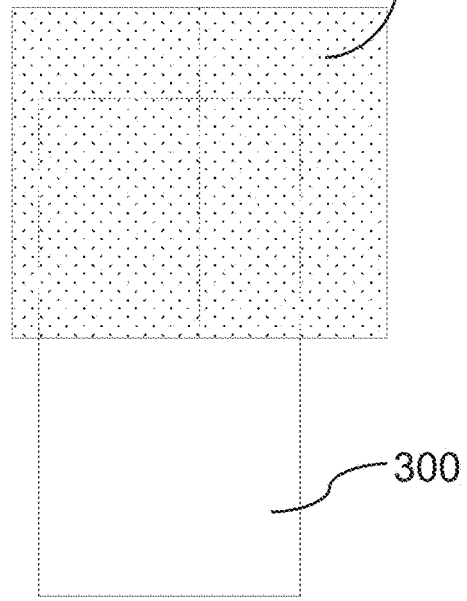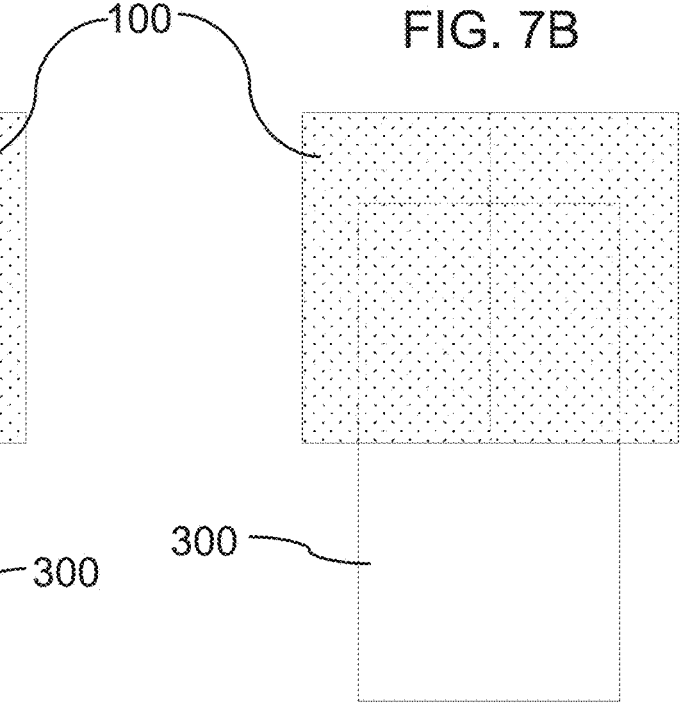
FIG. 7C  FIG. 7D

SHAPE-SHIFTING FINGERS FOR ROBOTIC GRIPPERS

CROSS-REFERENCE TO RELATED APPLICATIONS

This application claims the benefit of priority under 35 U.S.C. § 119(e) of U.S. Provisional Application 62/765,285 filed Aug. 20, 2018.

FIELD

Disclosed embodiments are related to shape-shifting fingers for robotic grippers.

BACKGROUND

A few part geometries and tools make up a large share of tasks in industrial assembly. Cylindrical objects, followed by prismatic ones, have been identified as predominant part shapes that are encountered in manufacturing industries. Grippers play a major role in the handling of these objects. Most of these gripper are two-finger grippers, mostly in a parallel-jaw form. However, a parallel-jaw gripper often compromises the dexterity of part handling for the benefit of simplicity and robustness. A common task then of grasping a cylindrical object lying horizontally on a surface in an upright configuration is conventionally accomplished with industrial robots supported with part feeders which take care of reorienting the parts for manipulation by the gripper.

SUMMARY

In one embodiment, a gripper includes two gripper fingers. Each of the gripper fingers includes a flexible membrane that forms at least a portion of a cavity, where the flexible membrane is moveable between an extended state and a retracted state in response to a pressure applied to the cavity. Each of the gripper fingers also includes a contact disposed on the flexible membrane, where the contact is configured to contact an object when the flexible membrane is in the extended state and facilitate manipulation of the object.

In another embodiment, a method for operating a gripper includes placing two gripper fingers adjacent an object and applying a pressure to a flexible membrane of each gripper finger to move the flexible membrane of each finger to an extended state where a contact of each finger is in contact with the object.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIGS. 7A-7D depict one embodiment of a process for aligning an object between the fingers of a gripper;

DETAILED DESCRIPTION

Figure 1:
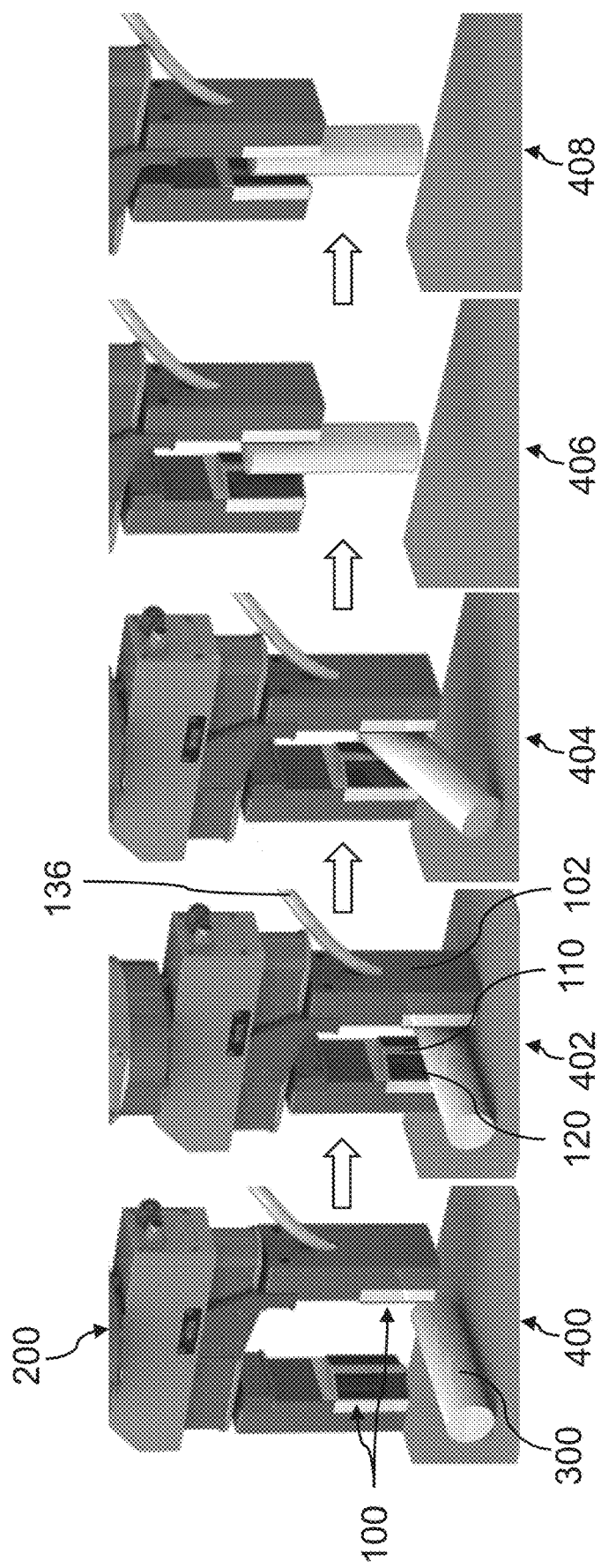
FIG. 1 depicts one embodiment of a method for picking up and reorienting an object using a gripper including shape-shifting fingers.

In conventional industrial applications, part feeders are used to reorient parts for grasping and subsequent manipulation by a gripper. Conventional grippers are typically unable to re-grasp or reorient an object once picked up, which leads to problems if parts are misaligned or misplaced. Accordingly, customized fixtures and/or part feeders may be needed for each task and/or part that a gripper interacts with. Therefore, grippers are typically expensive and complex to implement in an industrial environment. Additionally, due to this customization for individual tasks, once an industrial application is setup, reconfiguring a conventional gripper as well as the associated part feeders and/or fixtures is typically costly and time consuming.

In view of the above, the inventors have recognized the benefits of gripper fingers that are constructed to change their geometry to facilitate manipulating objects while they are grasped by the gripper. For example, the shape of the fingers of a gripper may be changed between at least first and second configurations to reorient an object from at least a first orientation relative to the gripper to a second orientation relative to the gripper while held by the fingers of the gripper. In one such embodiment, an object may be reoriented from a horizontal pose to a vertical pose relative to a gripper the object is held by. Grippers including these types of reconfigurable fingers may be beneficial for completing common industrial tasks without complex or expensive part feeders and/or fixtures including for example, picking up objects from a table or a conveyor and then fitting them into a product in the upright pose.

In one embodiment, a gripper includes at least two gripper fingers. Each gripper finger may include a flexible membrane that is moveable between an extended state and a retracted state in response to a pressure applied to the flexible membrane. A contact on each gripper finger is configured to contact an object when the flexible membrane is in the extended state. For example, the contact may be located on an outer most portion the flexible membrane when in the extended state. Additionally, in the extended state, the contact may allow the object to pivot by gravity to a desired orientation, including a vertical orientation. Without wishing to be bound by theory, in order to pivot an object while grasped between at least two gripper fingers under the effect of gravity, the contact of each finger may be configured to provide a low torsional friction to the associated object. For example, relatively small contact areas, and optionally low friction materials, may be used for the contacts to provide small torsional friction to the objects when grasped by the fingers with the membranes in the extended state. Once the object has pivoted to the desired orientation, the flexible membrane may be moved to the retracted state to securely grasp the object in the desired orientation. Without wishing to be bound by theory, in order to securely hold an object, when in the retracted state, the membranes may have an appropriate shape and construction to constrain the object in the desired orientation while also providing sufficient frictional resistance to inhibit motion of the object held between the fingers of the gripper. Thus, the disclosed gripper fingers including flexible membranes may permit the gripper fingers to change contact geometry between the fingers and the object to facilitate reorienting the object between a first orientation and a second orientation relative to the gripper.

Dependent on the particular application, gripper fingers may exhibit different specific shapes and overall constructions for interacting with a desired type of object while in the extended and retracted states to promote reliable reorientation and grasping of an object between first and second orientations of the object. In some embodiments, the fingers may include relatively small area contacts in the extended state at low grasping force to facilitate pivoting of the object in the grasp. For example, the contact of a finger in the extended state may be shaped to provide an approximate point or line contact with a grasped object. In some embodiments, while in the retracted state, the fingers of a gripper may provide contacts with the object that have appropriate geometries and sufficient friction to securely grasp the object in the desired orientation. For example, the fingers may have a V-shaped contact area when the membranes of the fingers are in the retracted state which may help to constrain the object.

In some embodiments, the fingers may be able to reorient and grasp objects of different sizes and weights if the objects have the same shape. For example, the gripper fingers may change between a retracted state and an extended state in response to pressure which may be modified for a given size and weight of an object. In some embodiments, the fingers may be tolerant of misalignment of the object relative to the gripper so that an object does not need to be grabbed in the exact same location for multiple grasps. For example, the fingers may have a shape in the retracted state that aids in aligning the object with a desired position. For example, the above noted V-shaped contact area may help to center a circular, or other appropriately shaped, object within the V-shaped contact area when the object is grasped between the fingers in the retracted state.

As noted above, in some embodiments, the gripper fingers of a gripper may include a flexible membrane. The flexible membrane may be configured to change shape in response to a pressure (e.g., air pressure, hydraulic pressure, etc.) applied to an internal surface of the membrane. For example, a pressure within a cavity at least partially defined by the membrane may be controlled relative to a gripping force applied by the gripper to an object to selectively move the membranes of the one or more fingers between the extended and retracted states. Depending on the particular embodiment, the flexible membranes may include a combination of flexible and rigid structures. In one such embodiment, rigid structures connected to each other by one or more compliant structures may provide desired membrane geometries in the extended and retracted states. That is, the rigid structures may move between an extended state and a retracted state to provide a distinct shape to the finger in each state. Accordingly, the flexible structures may function as hinges which interconnect the rigid structures to allow the transition between the expanded and retracted states. By changing the shape of the finger membrane, the contact area between the object and the fingers may be modified so that it is appropriate for distinct manipulation modalities of the object.

It should be understood that while separate rigid and compliant structures are noted above, embodiments in which these structures are integrally formed into a single structure are contemplated. For example, in one embodiment, a membrane may be made with portions that are relatively thicker than surrounding portions to provide more rigid sections of a membrane while the thinner portions of the membrane may be more compliant, and thus, may function as hinges between adjacent thicker sections of the membrane and/or with a connected supporting structure.

In some embodiments, a method for operating a gripper to grasp an object in a first or horizontal orientation and reorient the object to a second or vertical orientation includes placing two gripper fingers adjacent the object. A pressure may be applied to a flexible membrane of each gripper finger to move the flexible membrane to an extended state. When the flexible membranes of the fingers are in an extended state, the gripper may displace the fingers towards the object to compress the object therebetween with suitable gripping force to lift the object. The method may further include lifting the object with the gripper while the membranes of the fingers are in the extended state. As the object is lifted, the object may pivot from an initial, or horizontal, orientation to a second, or vertical, orientation under the effect of gravity while gripped by the fingers. The method may also include reconfiguring the membranes of the fingers to a retracted state. Depending on the desired operation, the membranes may be moved to the retracted state by either reducing the pressure applied to the flexible membranes and/or by increasing a gripping force applied to the fingers relative to the object. As the membranes transition to the retracted state, the membranes of the fingers may assume an appropriate shape for holding the object in the desired orientation as detailed further below.

As noted previously, the various embodiments of membranes disclosed herein may exhibit shapes in the extended and retracted states to help provide the desired functionalities for manipulating and maintaining the orientation of an object relative to a gripper. For example, in some embodiments, when a flexible membrane is in the extended state the membrane may exhibit a triangular prism or wedge shape so that an outermost portion of the flexible membrane in the extended state contacting an object may be approximated as a point or line contact. Alternatively, a membrane with a cone-like shape in the extended state for forming a point contact with an object may also be used. Correspondingly, in some embodiments, in the retracted state a flexible membrane of a finger may form a V-shaped, or other recessed channel, that may at least partially complement a shape of, or form a contact with, the object to help urge the object towards, and secure the object in, the desired final orientation and/or position of the object relative to the gripper.

In some embodiments, a gripper including gripper fingers with corresponding flexible membranes may be easily reconfigured for use with different sized objects with a variety of weights. The shape of the pressurized membrane may be determined by a combination of pressure in the membrane and externally applied gripping force. That is, the addition of gripping force by the gripper may increase the internal pressure of the flexible membrane in some embodiments such as in a mode of operation when flow out of a cavity at least partially defined by the membrane is prevented. However, embodiments in which a pressure applied to a membrane does not vary with gripping force and/or where the applied pressure may be varied separate from gripping force are also contemplated. Accordingly, modifying the internal pressure of the membrane and/or the gripping force applied by the fingers may allow the geometry of the finger and its contact with a gripped object to be precisely controlled. As a result, by adjusting gripping force and/or the pressure applied, objects of different weights and sizes can be manipulated without changing the overall gripper finger design. Of course, different fingers with different shapes and arrangements than those shown herein may be employed for a particular object with specific size, weight, and shape characteristics, as the present disclosure is not so limited.

In some embodiments, a pressure source is fluidly connected to a cavity of a flexible membrane of a gripper finger to move the flexible membrane between an extended state and a retracted state. In some embodiments, the cavity may be in selective fluid communication with a positive pressure source such as an air compressor, hydraulic pump, gas cylinder, or other suitable positive pressure source. The positive pressure source may be configured to apply a positive pressure to the flexible membrane to move the flexible membrane to the extended state. In some embodiments, a negative pressure source may be in selective fluid communication with the cavity such as a Venturi pump, rotary vane pump, scroll pump, Roots pump, or any other suitable negative pressure source. The negative pressure source may be configured to apply a vacuum to the flexible membrane to move the flexible membrane to a retracted state. In an alternative embodiment, the flexible membrane cavity may be in selective fluid communication with a release valve so that positive pressure may be released from the flexible membrane to move the membrane to the retracted state. In another embodiment, a bidirectional pump may be used. In such an embodiment, the bidirectional pump may function both as the positive and negative pressure sources by simply operating in a desired direction to either increase or decrease a pressure applied to the membrane. In yet another embodiment, a gripper may include a directional control valve which may provide selective communication between the flexible membrane cavity and any desired pressure source and/or outlet to control a pressure applied to the membrane.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 depicts one embodiment of a method for picking up and reorienting an object using fingers 100 with a gripper 200. As shown in FIG. 1, the gripper includes two fingers which are arranged to move between an extended state and a retracted state in response to an applied pressure. The fingers each include a flexible membrane 110 with a contact formed at its outermost surface in the extended state and rigid portions 120 connected thereto. According to the embodiment of FIG. 1, the fingers include a finger support 102 which supports the flexible membrane and provides fluid communication between a cavity of the flexible membrane and a pressure source (not shown) via a tube 136 or other appropriate connection. The gripper is arranged to translate the fingers relative to each other to grasp an object 300.

As shown in FIG. 1 in state 400, the gripper 200 is in a fully open configuration and the fingers 100 are in an extended state. That is, the gripper has moved the fingers so that each finger is positioned on an opposite side of the cylindrical object 300 which is in a horizontal orientation. In state 400 as shown in FIG. 1, a positive pressure is applied to the cavity of the flexible membrane 110 to maintain the flexible membrane in the extended state. In state 402, the gripper has translated the fingers toward each other to grasp the object. According to the embodiment of FIG. 1, each of the fingers includes a linearly shaped contact surface that approximately forms a point contact with the cylindrical object gripped there between. As shown in state 404, as the gripper lifts the object, the contact point grasps the object with suitably low friction to allow the object to rotate under the effect of gravity to a vertical orientation. Once the object has rotated to a vertical orientation as shown in state 406, the gripping force applied by the gripper may be increased and/or a reduced pressure may be applied to the flexible membrane to move the flexible membrane to a retracted state. As the flexible membrane moves to the retracted state as the fingers are also displaced towards each other, the object may be contacted by additional portions of the flexible membrane, such as rigid portions of the membrane, to provide kinematic and/or geometrical constraints to the object. As shown in state 408, the cylindrical object is securely grasped in the fingers in the retracted state. In the embodiment shown in FIG. 1, the flexible membrane forms a V-shaped channel which effectively surrounds and secures the cylindrical object for further manipulation or placement.

Figure 2:
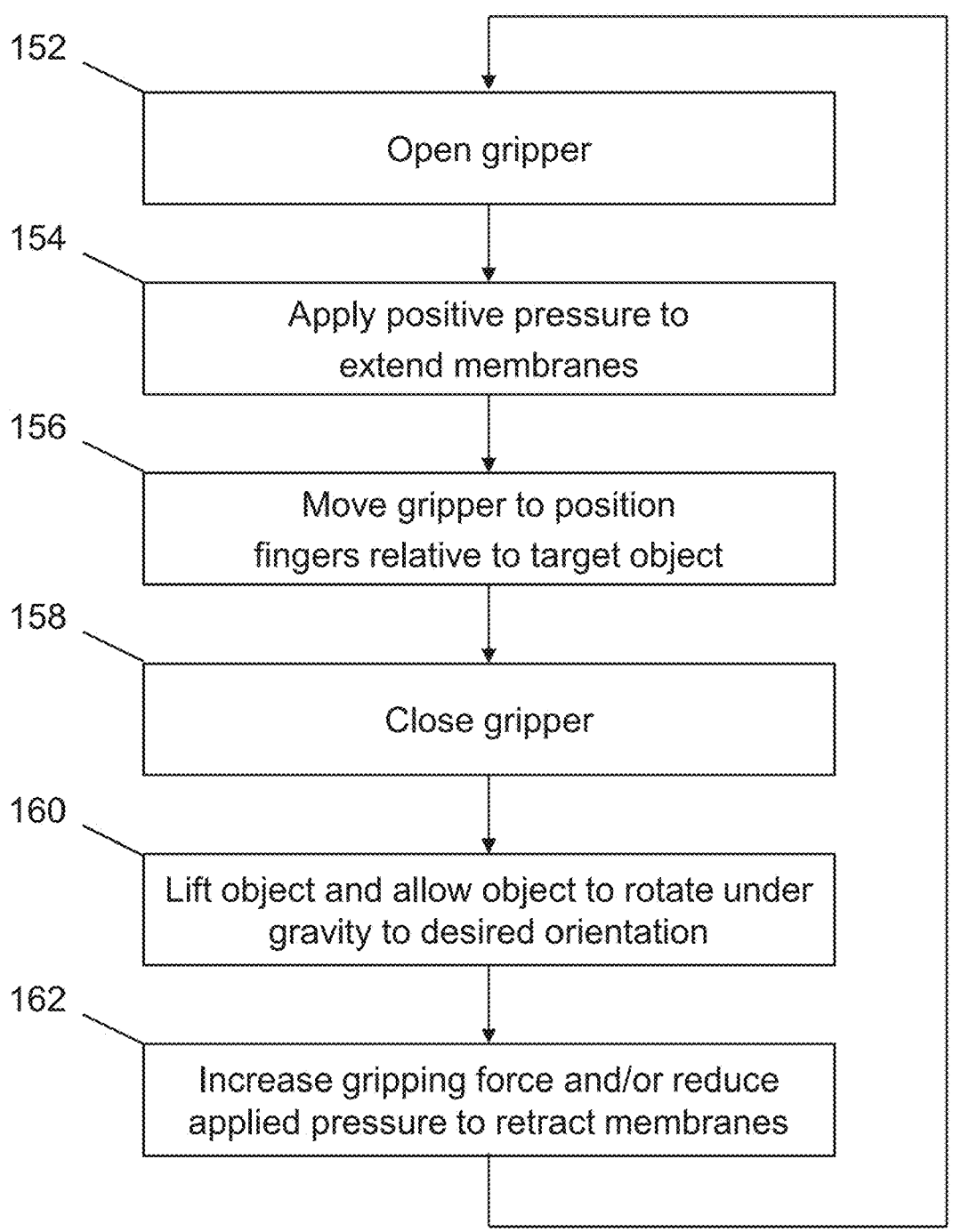
FIG. 2 is a flow diagram of one embodiment of a method for operating a gripper using shape-shifting fingers.

One embodiment of a method 150 to control a gripper is presented in FIG. 2. In the depicted flow diagram, a gripper is opened at 152. A positive pressure may then be applied to the fingers of the gripper to extend the flexible membranes, or other flexible structures, to an extended state at 154. Either prior to, during, and/or after extending the flexible membranes to the extended state, the gripper may be moved relative to a target object such that two or more fingers of the gripper may be disposed on opposing sides of the object at 156. The gripper may then be closed at 158 to grasp the object between the two or more fingers of the gripper, which in the extended state may form point contacts on opposing sides of the object. The gripper may then be translated vertically, or in another appropriate direction, relative to a surface, such that at least a portion, and in some instances an entirety, of a weight of the object is supported by the fingers to allow the object to rotate under gravity to a desired orientation while grasped by the fingers of the gripper at 160. The gripping force of the gripper may be increased and/or a pressure applied to the flexible membranes may be reduced in order to retract the flexible membranes to a retracted state at 162 as described previously to firmly grasp the object within the grippers and maintain it in a desire orientation and/or position within the gripper. Further, gripper operations and/or translations of the object once appropriately grasped may then be implemented depending on the particular application.

Figure 3A:
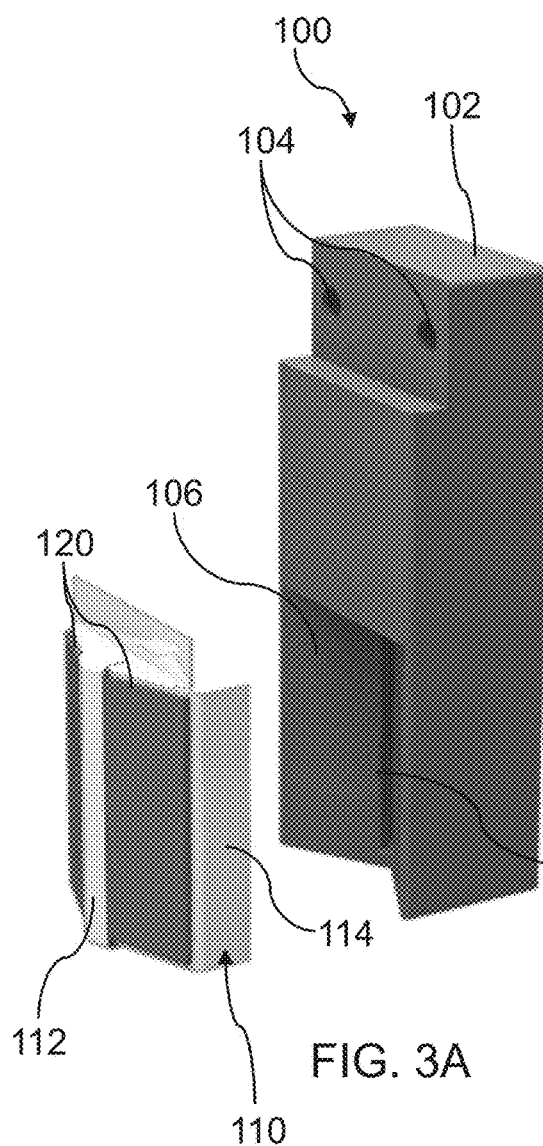
FIG. 3A is an exploded view of one embodiment of a finger.

FIG. 3A is an exploded view of one embodiment of a finger 100. As shown in the figure, the finger includes a finger support 102 and a flexible membrane 110 which is configured to assume at least two different particular shapes in response to different pressures and/or forces being applied to the flexible membrane. The flexible membrane includes rigid portions 120 that are connected to compliant portions 114 which are connected to opposing sides of a connection with the flexible membrane and the finger support. The rigid portions are connected to each other by a contact 112, which may be a compliant structure, disposed there between. The rigid portions may help provide a rigid structure to form the desired geometry of the membrane at different air-pressure levels, and the compliant portions and contact may act as hinges to permit the rigid portions to transition between these geometries. In some embodiments, the rigid portions of the membrane are hard plastic panels while the compliant portions are cut from a rubber sheet. Of course, any suitable material for the rigid and compliant portions may be employed, including, but not limited to, low-density or high-density plastics, latex, nylon, polychloroprene, rubber, metals, composites, and ceramics as the present disclosure is not so limited.

As shown in FIG. 3A, the finger support 102 includes mounting holes 104, a membrane support channel 106, and a fluid channel 132. The mounting holes may be used to mount the finger to a gripper using any suitable fastener such as a bolt, screw, rivet, or pin though other types of fastening may also be used. The membrane support channel is arranged to receive and secure the flexible membrane to the finger support. According to the embodiment shown in FIG. 3A, the membrane support channel is a V-shaped channel that helps to at least partially define and/or support the shape of the flexible membrane in a retracted state. Of course, the membrane support channel may have any shape suitable for supporting the flexible membrane, including, but not limited to, square, U-shaped, and polygonal. In some embodiments, the membrane support channel may have a shape corresponding to the shape of the object the fingers are configured to grasp. For example, the membrane support channel may be configured as a V-shaped channel to grasp a cylindrical object. According to the embodiment shown in FIG. 3A, the fluid channel 132 provides fluid communication between a cavity at least partially defined by the flexible membrane and a pressure source so that pressure may be applied to the flexible membrane to move the flexible membrane between an extended state and a retracted state.

Figure 3B:
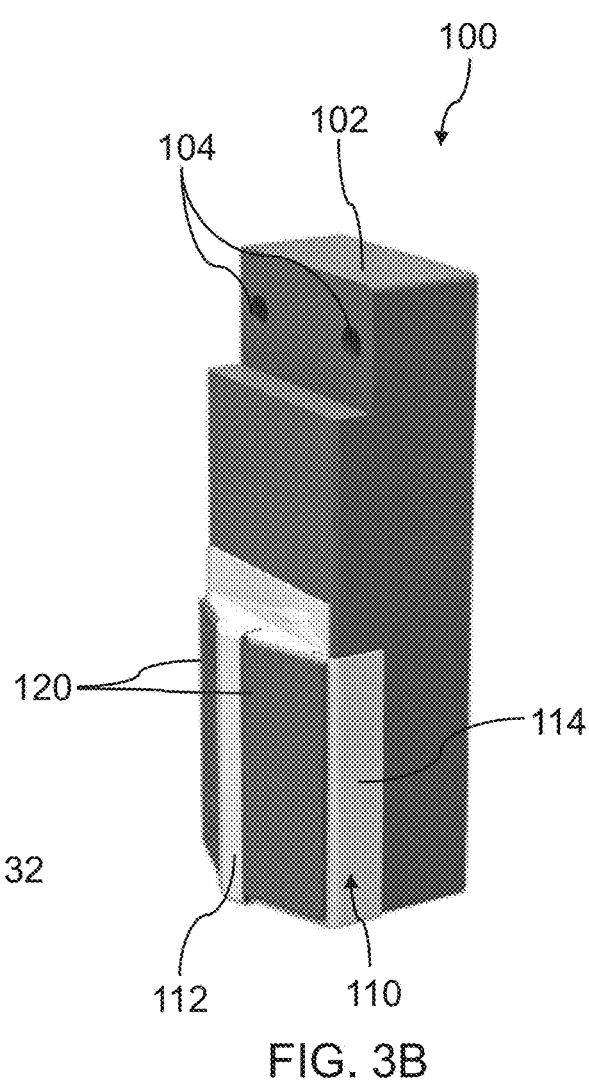
FIG. 3B is a perspective assembled view of the finger of FIG. 3A.

FIG. 3B is a perspective assembled view of the finger 100 of FIG. 3A. As shown in FIG. 3B, the flexible membrane 110 is received in the membrane support channel formed in the finger support 102. The flexible membrane may be secured to the finger support using any suitable adhesive or fastener. In some embodiments, the flexible membrane is sealed against the finger support so that a desired pressure may be applied to the cavity formed there between. In other embodiments, the cavity may be integrally formed in the flexible membrane and directly connected to a pressure source, as the present disclosure is not so limited.

Figure 4A:
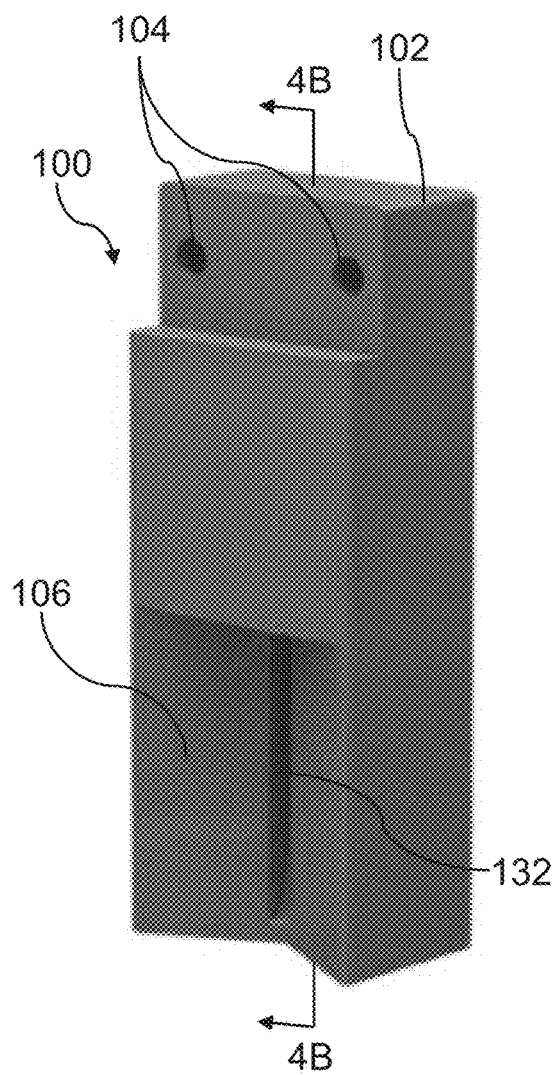
FIG. 4A is a perspective view of one embodiment of a finger support.

FIG. 4A is a perspective view of one embodiment of a finger support 102 of a finger 100. As shown in FIG. 4A, the finger support includes mounting holes 104, a membrane support channel 106, and a fluid channel 132. The fluid channel is configured to fluidly connect a cavity of a flexible membrane to a pressure source. As discussed previously, the pressure source may be a positive pressure source or a negative pressure source which supplies a corresponding positive or negative pressure to the cavity. As shown in FIG. 4A, the fluid channel extends the entire length of the membrane support slot. In other embodiments, the fluid channel may be circular or otherwise extend along only a portion of the membrane support slot. In some embodiments, the fluid channel may provide a support for the flexible membrane when the membrane is in a retracted position by receiving and supporting at least a portion of the membrane.

Figure 4B:
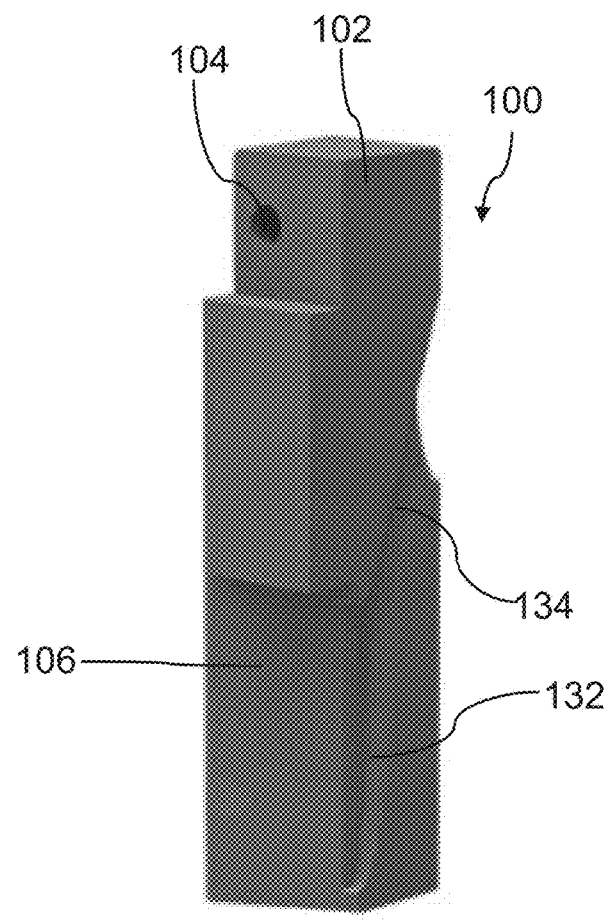
FIG. 4B is a cross-sectional view of the finger support of FIG. 4A taken along line 3B-3B.

FIG. 4B is a cross-sectional view of the finger support 102 of FIG. 4A taken along line 4B-4B. As shown in FIG. 4B, the fluid channel 132 is integrally formed in the finger support along with a fluid connector 134. The fluid connector 134 may be arranged to connect to tubing or piping which is fluidly connected to a pressure source. The tubing or piping may be connected by interference fit, adhesives, fasteners, or any other suitable fastening arrangement. In some embodiments, the finger support may be 3D printed and/or the finger support may be formed of plastic, metal, composites, or any other suitable material. In some embodiments, the fluid channel may be configured to receive a tube or pipe such that the fluid channel does not actually come into fluid contact with fluid from the pressure source. Of course, the fluid channel may contact and fluidly connect the flexible membrane to the pressure source directly as the present disclosure is not so limited.

Figure 5A:
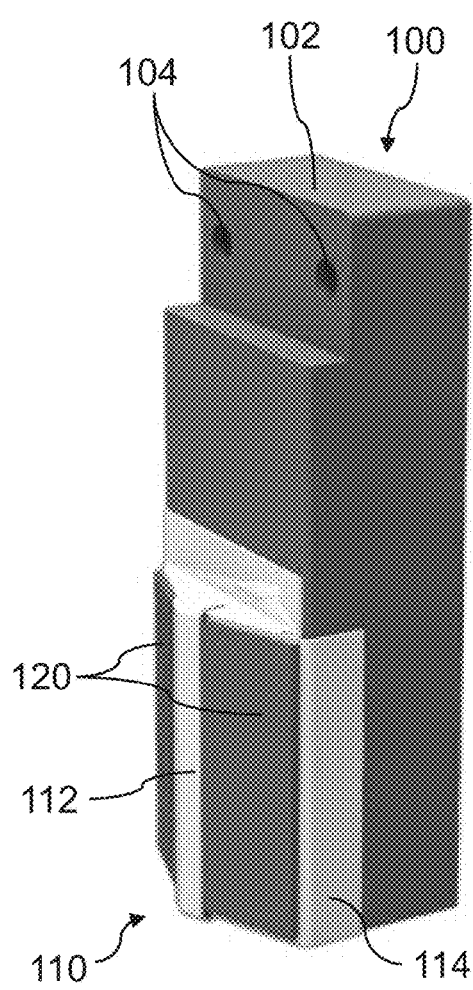
FIG. 5A depicts one embodiment of a finger including a flexible membrane in an extended state.

FIG. 5A depicts one embodiment of a finger 100 in an extended state. The finger includes a finger support 102 and a flexible membrane 110 configured to move between an extended state and retracted state in response to applied pressure. Similar to the embodiments described above, the flexible membrane includes a contact 112, rigid portions 120, and compliant portions 114. As discussed previously, for reliable re-grasping the shape of the object may determine the desirable contact type and consequently the desired geometry of the flexible membrane of the finger in the extended and retracted states. For example, for pivoting and grasping tasks for cylindrical objects, a wedge-shaped extended state and V-shaped retracted state may be suitable membrane geometries. As shown in FIG. 5A, in the extended state the flexible membrane is in a wedge shape with the contact 112 forming an outer most region of the flexible membrane extending out from the finger. In the wedge-shaped geometry, the approximately linear cross section of the contact may be approximated as a point contact on a cylindrical object such that the cylindrical object is able to pivot to a vertical position under the effect of gravity. Of course, the contact may exhibit an outer profile as well. For example, the contact may have a curved profile, a wedge shaped profile, and/or any other appropriate profile and/or overall cross sectional shape as the disclosure is not so limited. In any case, the contact may provide a low-friction pivot point which does not substantially resist the rotation of the cylindrical object being picked up. Pressure (e.g., air pressure) may be applied to a cavity at least partially defined by the membrane to maintain the flexible membrane in the extended state.

Figure 5B:
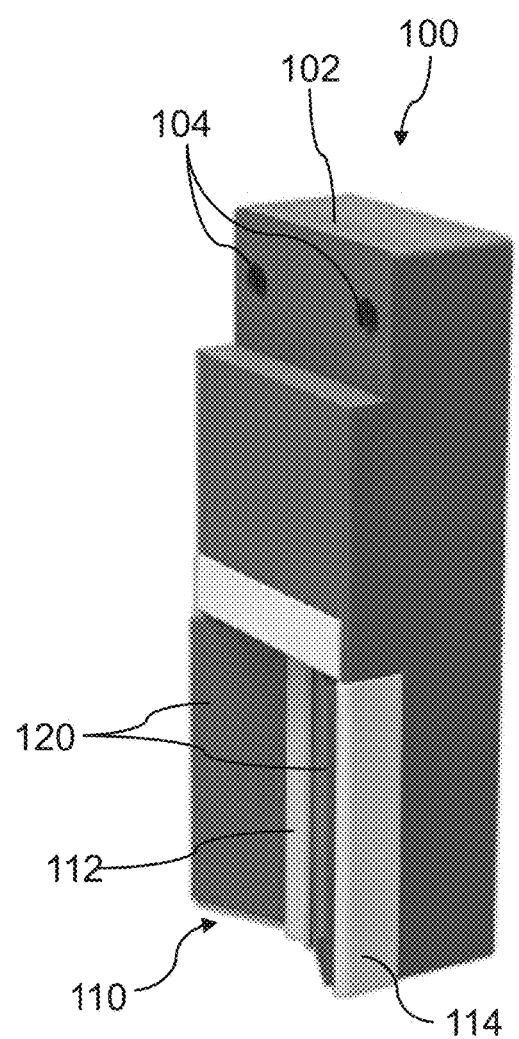
FIG. 5B depicts the finger of FIG. 5A with the flexible membrane in a retracted state.

FIG. 5B depicts the finger 100 of FIG. 5A in a retracted state. As shown in FIG. 5B, the flexible membrane 110 is moved to a V-shaped geometry when the flexible membrane is in the retracted state. To change to the retracted geometry, a reduction in pressure may be applied to a cavity at least partially defined by the flexible membrane and/or a force applied to the membrane relative to an object grasped between the fingers of a gripper may be increased. In some embodiments, a vacuum may be applied to the cavity. In other embodiments, the pressure in the cavity may simply be released by a valve. Once in the V-shaped retracted state, the flexible membrane may localize the object in the vertical position and securely hold it. That is, the walls of the V-shape channel may engage opposite sides of an object to provide kinematic and/or geometrical constraints such that the object may be maintained in a vertical, or other appropriate, orientation. In some embodiments, the V-shaped channel may also translate and center a grasped object such as a cylindrical object.

Figures 6A, 6B:
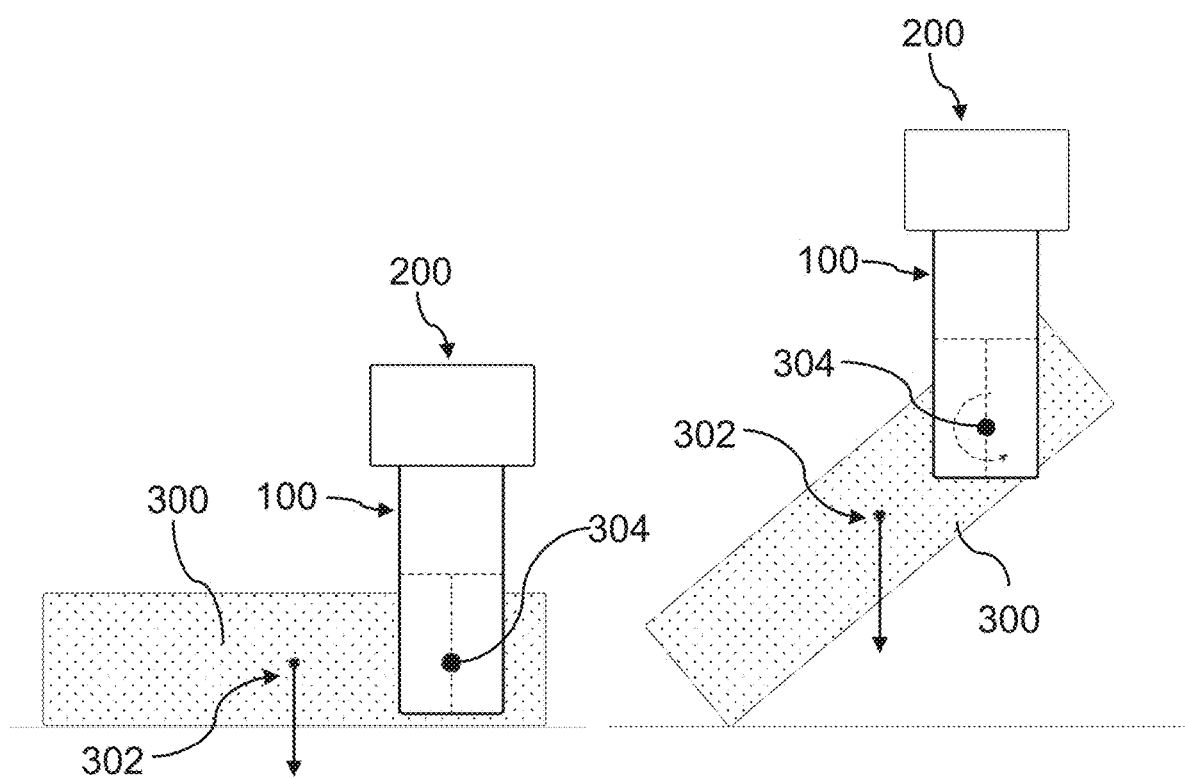
FIGS. 6A-6B are schematics of one embodiment of a gripper picking up an object.

FIG. 6A depicts a schematic of one embodiment of a gripper 200 including fingers 100 picking up an object 300. As shown in FIG. 6A, the fingers 100 are placed adjacent the object and grasp the object away from the object's center of gravity 302. The fingers are in an extended state and are moved towards each other so that contact points 304 are formed between the fingers of the gripper and the object grasped there between. In some embodiments, a wedge-shaped finger provides a point contact with the object. Without wishing to be bound by theory, the contact points 304 may be a suitably small area contact patch or region on the object which is representative of a point or other appropriate geometry for facilitating pivoting of the object relative to the gripper. According to the embodiment shown in FIG. 6A, regardless of the position of the fingers, the fingers will make two opposite contacts on the object. In some embodiments, the object 300 is a cylindrical object which allows for additional geometries to be used on the fingers to provide point contact. For example, wedge-shaped fingers may make a point contact on a cylindrical object regardless of the position or offset of the fingers on the object.

FIG. 6B shows a schematic of the gripper 200 and fingers 100 of FIG. 6A while pivoting an object 300. As shown in FIG. 6B, the gripper has partially lifted the object off of the ground from the contact point 304. Without wishing to be bound by theory, the contact point provides a small area of contact between the fingers and the object so that there is little torsional resistance to the rotation of the object. Accordingly, as the center of gravity 302 is offset from the contact point, the object pivots about the contact point under the effect of gravity. The object will continue to pivot until the center or gravity is directly beneath the contact point or the torsional resistance provided by the contact point overcomes the moment arm of the gravitational force. Thus, the arrangement shown in FIG. 6B allows the object to pivot to a vertical orientation as the gripper lifts the object.

In some embodiments, a method of grasping a cylindrical object using the gripper 200 and fingers 100 of FIGS. 6A-6B includes supplying high pressure air to inflate a shape-shifting membrane of the fingers to an extended state to create the wedge-shaped finger. The wedge-shaped finger may provide a contact line which may be used to engage the cylindrical object to create contact points. The method may further include placing the gripper over the object offset to the center of the object and grasping the object with low gripping force. The low gripping force may be sufficient to lift the object while reducing torsional resistance due to the contact between the gripper and the cylindrical object. Once the object has been grasped, the object may be lifted by the gripper and as it is lifted the object pivots under gravity as shown in FIG. 6B. Once the object is in a vertical orientation, the air pressure may be lowered and/or the gripping force may be increased to move the flexible membrane to a retracted state and provide kinematic and/or geometrical constraints for the object. In some embodiments, the membrane may form a V-shaped channel which may localize and secure the cylindrical object in the gripper.

FIGS. 7A-7D depict one embodiment of a process for aligning an object 300 between fingers 100. FIGS. 7A-7B show a top schematic of the object disposed between fingers 100. Each of the fingers 100 includes a flexible membrane 110 which is moveable between an extended state and a retracted state. According to the embodiment of FIGS. 7A-7D, the flexible membrane is configured to form a V-shaped channel in the retracted state. As shown in FIG. 7A, the object is offset from the center between the fingers. As the fingers are brought together to grip and secure the object, the inclined walls of the V-shaped channel forces the object towards the center. As shown in FIG. 7B, once the fingers are sufficiently brought together the V-shaped channel provides kinematic constraints to localize the object in the center between the fingers.

FIGS. 7C-7D depict side schematics of the process of FIGS. 7A-7D for localizing and securing an object 300 between fingers 100. As shown in FIG. 7C, the object is offset from the center of the fingers, corresponding to the position shown in the top schematic in FIG. 7A. As the fingers are closed around the object and the flexible membrane is in a retracted state to from a V-shaped channel, the inclined walls of the V-shaped channel translate the object toward the center of the fingers. As shown in FIG. 7D, once the fingers are fully closed around the object and the object is centered corresponding to the position shown in the top schematic in FIG. 7B, the object is in contact with each of the four walls of both V-shaped channels which provide kinematic and/or geometrical constraints to secure the object.

As shown in the embodiment of FIGS. 7A-7D, the contact 112 of the flexible membrane 110 is out of contact with the object 300 when the flexible membrane is in the retracted state. The contact may be arranged to contact the object when the membrane in in an extended state to provide low torsional resistance to allow the object to pivot easily. However, in the retracted state it may be more beneficial to provide high torsional resistance to provide kinematic constraints to secure the object in the grippers for subsequent manipulation. Accordingly, moving the contact 112 out of contact with the flexible membrane when the membrane is in the retracted state may allow other surfaces of the flexible membrane to better engage and the secure the object for some configurations. Of course, the contact may be in contact with the object when the flexible membrane is in the extended state and the retracted state, as the present disclosure is not so limited.

Figure 8A:
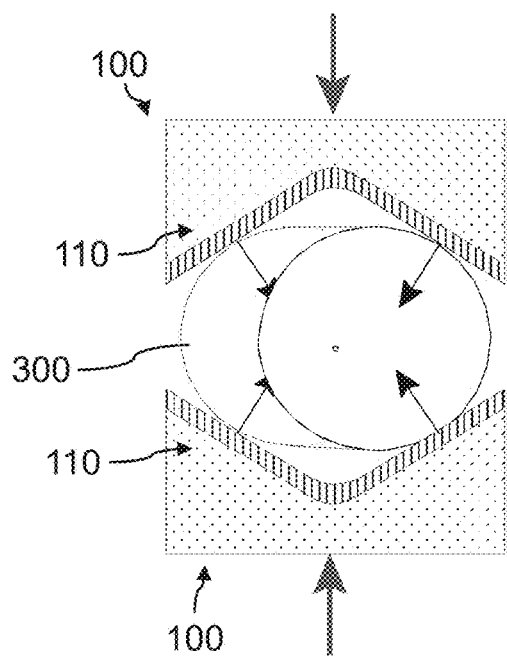
FIGS. 8A-8D depicts another embodiment of a process for aligning an object between the fingers of a gripper.
Figure 8B:
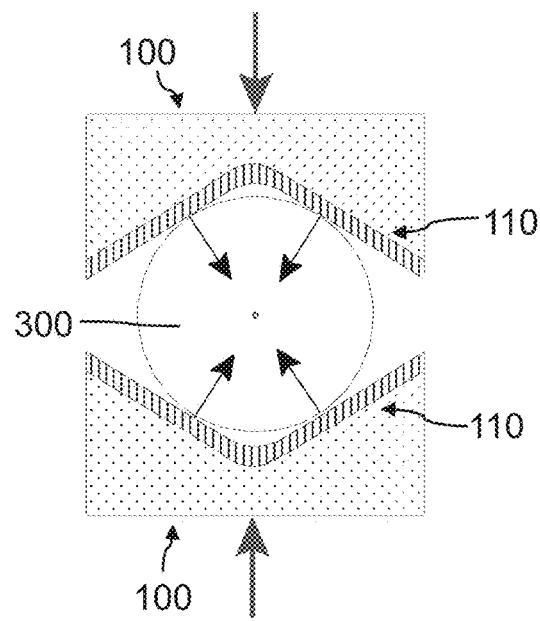

FIGS. 8A-8D depict another embodiment of a process for aligning an object 300 between fingers 100. The fingers each include a flexible membrane 110 shown in the retracted state forming a V-shaped channel. FIGS. 8A-8B show top schematics of a process for localizing and securing the object. According to the embodiment shown in FIG. 8A, the object is angularly offset from a vertical orientation. That is, a longitudinal axis of the object is out of alignment with a vertical axis. In some cases, such an arrangement may occur if the torsional resistance between the finger and the object inhibits the object from fully pivoting to the vertical orientation. According to the embodiment of FIGS. 8A-8B, if the object is not in the vertical orientation after the pivoting phase, the V-shaped channel may orient the object in the vertical orientation as the fingers are brought together around the object. That is, the object contacts the inclined walls of the V-shaped channel and is moved into alignment with the V-shaped channel as gripping force is applied. FIG.

8B shows the object in the fully vertical orientation after the fingers have closed around the object and corrected the orientation of the object to the vertical orientation. Thus, when the flexible membrane is in the retracted state, the membrane may be shaped so that the fingers may correct for any misalignment or offset of the object so that the object may be consistently localized.

Figure 8C:
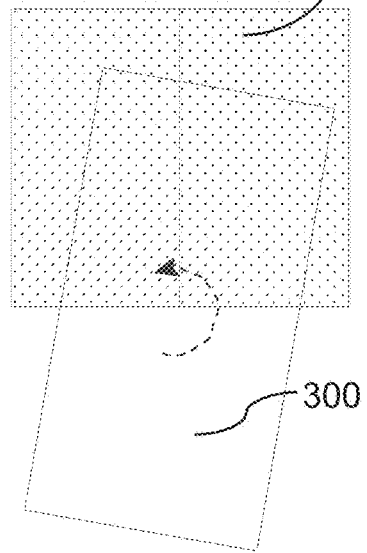
Figure 8D:
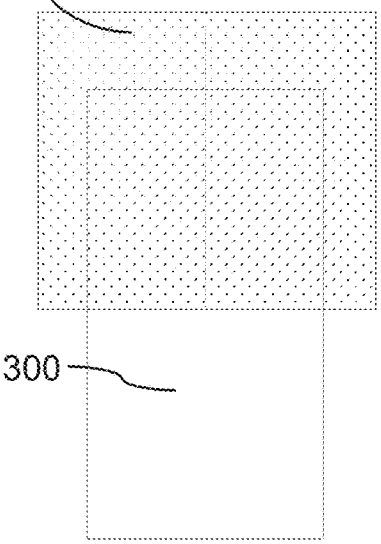

FIGS. 8C-8D depict side schematics of the process shown in FIGS. 8A-8B. As shown in FIG. 8C (a side schematic of FIG. 8A), the object 300 is rotated out of the vertical orientation. As the fingers 100 are brought together, the inclined walls of the V-shaped channel contact and rotate the object back towards the vertical orientation where the object is in alignment with the V-shaped channel. As shown in FIG. 8D (a side schematic of FIG. 8B), once the fingers are sufficiently brought together, the object is in the vertical position and is aligned and secured with the V-shaped channel. Thus, following the application of gripping force to the object, the object may be secured, aligned, and ready for manipulation by the gripper.

Figure 9:
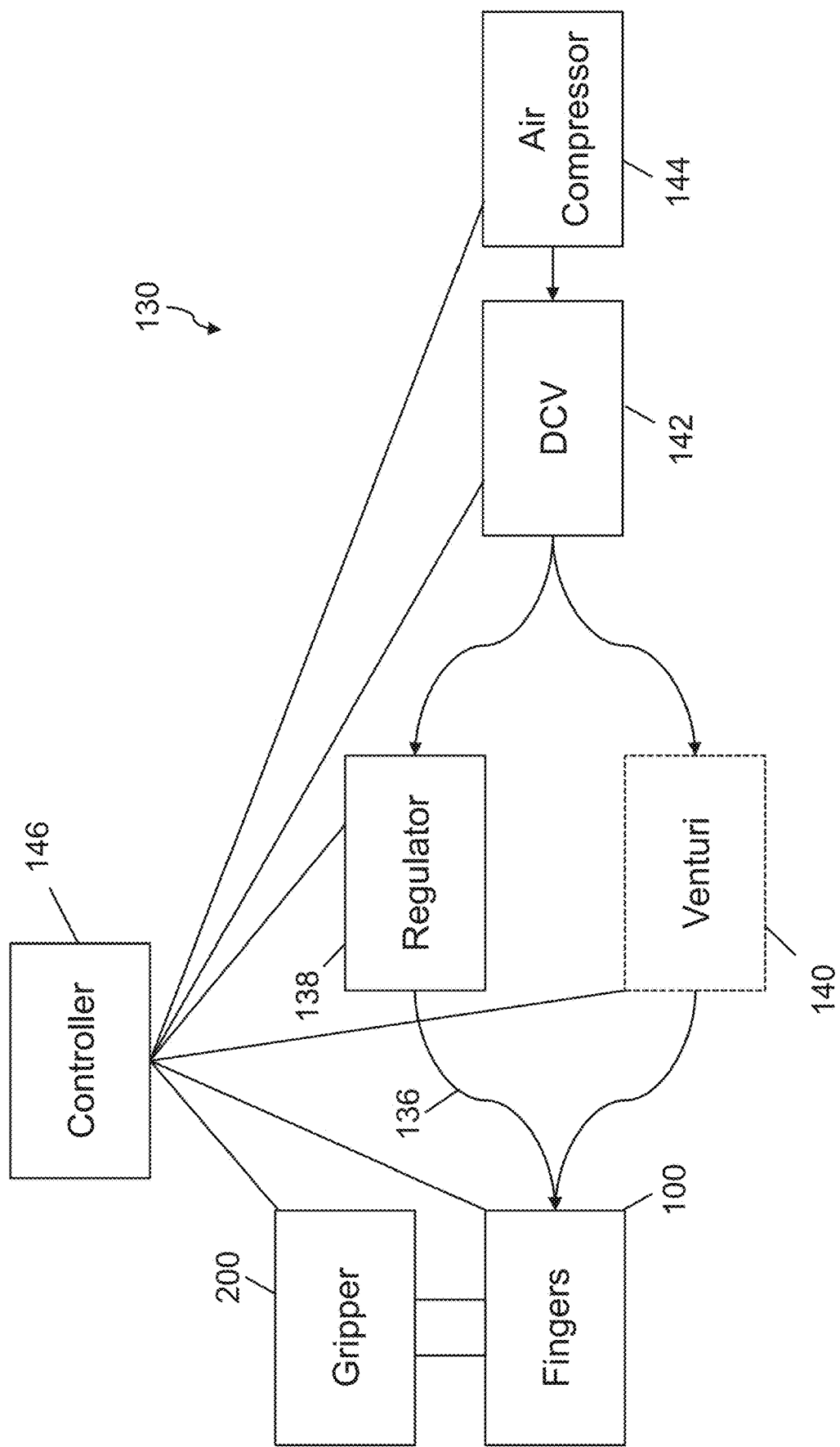
FIG. 9 depicts a schematic embodiment of a pneumatic system for controlling a finger.

FIG. 9 depicts one embodiment of a pressure system 130 for controlling fingers 100 of a gripper 200. As shown in FIG. 9, the pressure system includes an air compressor 144, or other appropriate pressure source, coupled to a directional control valve (DCV) 142. The DCV controls flow of pressurized gas between a regulator 138 and a Venturi 140. The regulator and Venturi are connected to the fingers 100 through a tube or other suitable fluid connector 136. The tube, or tubes, may connect to flexible membranes of the fingers so that a cavity at least partially defined by each of the flexible membranes is brought into selective fluid communication with the regulator or Venturi. According to the embodiment shown in FIG. 9, the regulator may function as a positive pressure source by supplying high pressure gas from the air compressor when the DCV selectively connects to the regulator. The regulator may be used to modify the pressure output to the fingers so that the gripping characteristics may be controlled and the shape of the flexible membranes is maintained. The Venturi functions as a negative pressure source which uses the high pressure gas from the air compressor to apply a negative pressure to the fingers as the high pressure gas flows through the Venturi. Accordingly, the DCV may be used to switch between positive and negative pressure applied to the fingers to move the flexible membrane to an extended state and retracted state, respectively. In some embodiments, the air compressor may supply an air pressure of approximately 20 psi.

The pressure system 130 also includes a controller 146 which may correspond to one or more processors including associated non-transitory computer readable medium including instructions that when executed by the one or more processors control the systems and components as described herein. For example, the controller may control motion of the gripper 200, and inflation of the fingers 100. Additionally, the controller controls operation of the regulator 138, the Venturi 140, the DCV 142, and the air compressor 144. The controller may additionally control other components not depicted in FIG. 9. For example, the controller 146 may control the motion of an a robotic arm to which the gripper may be attached. In some embodiments, a single controller may control multiple components. In other embodiments, a pressure system may include multiple controllers, each of which may be associated with one or more components of the pressure system.

In some embodiments, the Venturi 140 may be replaced by a release valve which allows pressure to vent from a flexible membrane of the fingers 100. That is, rather than applying a negative pressure, the release valve may be used to cause a reduced pressure in the fingers as the pressure inside is released. According to this embodiment, the release valve may be selectively activated to release pressure from the fingers, and sufficient grasping force may be applied by the grippers 200 to force air out of the membrane so that the membrane may move to a retracted state. For example, if in an extended state the flexible membrane has a wedge shape while positive pressure is applied to the membrane, the pressure reduction caused by the release valve and gripping force applied to the flexible membrane may transition the membrane to having a V-shaped channel. Thus, a single positive pressure source and a release valve may be sufficient to move a flexible membrane between an extended state and a retracted state.

In some embodiments, the pressure system 130 may be disposed remote from the gripper 200 and fingers 100. For example, if the gripper is mounted on an industrial robot, the pressure system may be in a centralized location or otherwise positioned away from the gripper. In this example, the industrial robot may include internal channels configured to route an air supply through the arm. Of course, the pressure system 130 may be disposed in any suitable location for controlling the pressure applied to a flexible membrane of a finger, as the present disclosure is not so limited.

Experiments were conducted to validate the performance and characterize controllable aspects of the gripper and fingers. For the experimental setup, each finger included a flexible membrane which was movable between an extended state and a retracted state in response to pressure applied to a cavity of the membrane. In the extended state, the flexible membrane was wedge-shaped such that a contact of the flexible membrane formed a line. When in contact with the cylindrical objects tested, the line contact formed an approximate point contact with the object. The flexible membrane was configured to receive air pressure from a pressure system which selectively moved the membrane between the extended and retracted states. The experimental setup is exemplary and different membrane or finger configurations may have different characteristics which may yield different results.

Figure 10:
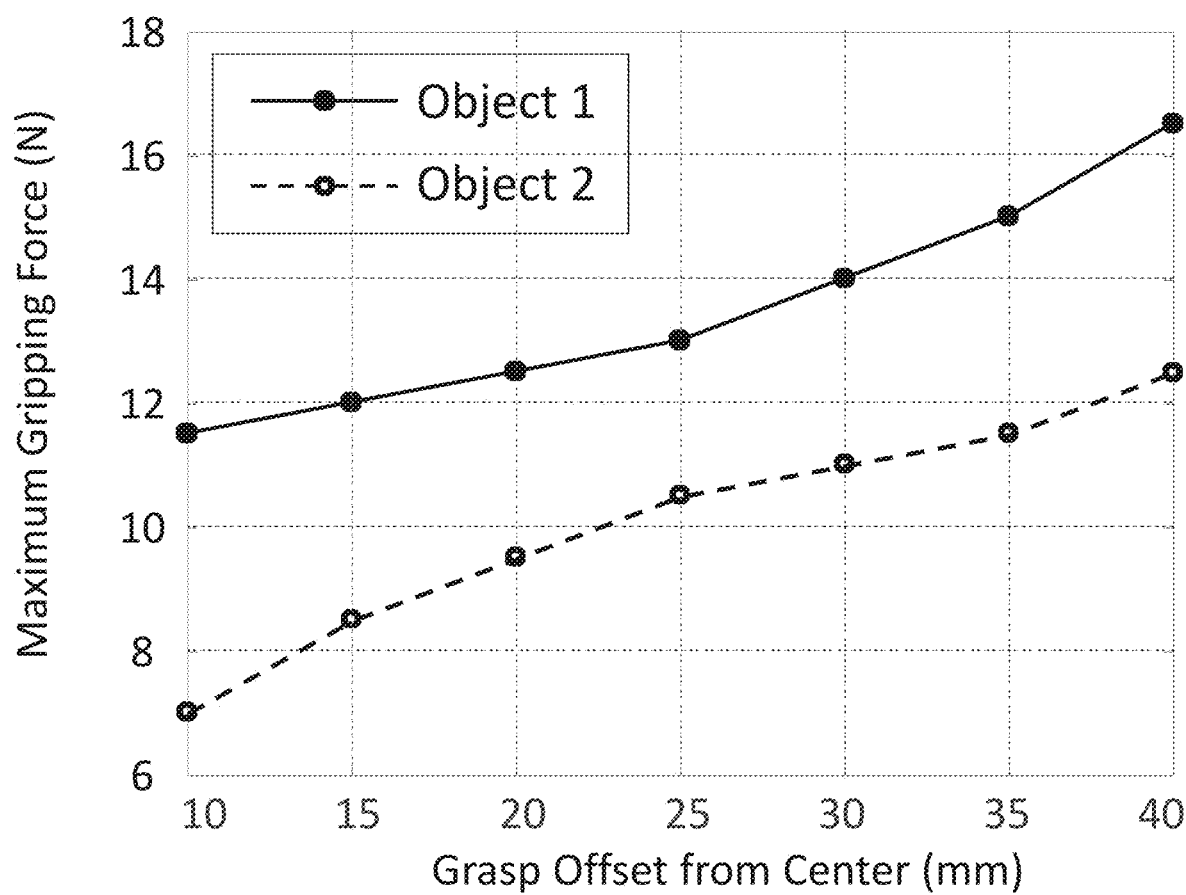
FIG. 10 is a graph showing experimental results for maximum gripping force for different objects and grasping locations on said objects for one embodiment of a finger.

FIG. 10 is a graph showing experimental results for maximum gripping force for different objects and grasping locations on said objects for one embodiment of a finger. As discussed previously, the geometry of a flexible membrane of the fingers may be a function of the air pressure inside the flexible membrane and the gripping force. As shown in FIG. 10, the maximum gripping force used to pivot the two different objects listed in Table 1 was experimentally characterized. For these experiments, a gripper grasped an object at a location offset to the center of the object and lifted the object to let it pivot under the gravitational force. The gripper repeated the procedure for different offset values and gripping forces. During the experiment, it was assumed that the position of the object is provided to the gripper. Accordingly, the position of the object was reset to the same location before every experimental run. A successful run was defined as a run in which the object pivoted to and secured in a vertical position, such as that shown FIG. 1, 7B, or 8B. The maximum gripping force was the largest force applied which resulted in a successful run.

TABLE 1

Objects used to test the maximum gripping force for pivoting versus the grasp offset from center as shown in FIG. 10.

| Object ID | Material | Dim [L, Diameter] (mm) | Mass (g) |
|---|---|---|---|
| Object 1 | Al 6061 | 100, 25 | 134 |
| Object 2 | Polysulfone | 100, 25 | 67 |

Without wishing to be bound by theory, a minimum gripping force may be governed by the weight of the object. For example, for the objects in Table 1 the minimum gripping force is less than 5 N, which may be less than the force limit of many grippers. Accordingly, the experiment focused on characterizing a maximum gripping force for which the gripper can pivot the object. According to the objects listed in Table 1, any force between 5 N and the maximum gripping force will be able to successfully pivot and secure the object. Of course, different objects may have different maximum and minimum gripping forces which may be based at least part on object shape, size, density, weight, material, texture, or any other appropriate characteristic of the object.

The results shown in FIG. 10 demonstrate a relationship between the offset distance and the maximum gripping force for a successful pivoting operation. As the offset distance is increased, the torque applied at the fingertips because of the weight of the object increases, so the object pivots to the vertical pose for a larger gripping force. Accordingly, grasping the object at a larger offset may be advantageous, because it provides a wider range for successful gripping forces. Such an arrangement may consequently provide robustness against any uncertainty in the gripping force. Of course, a gripper may grasp an object at any suitable offset for pivoting and subsequently securing an object between fingers, as the present disclosure is not so limited.

Figure 11:
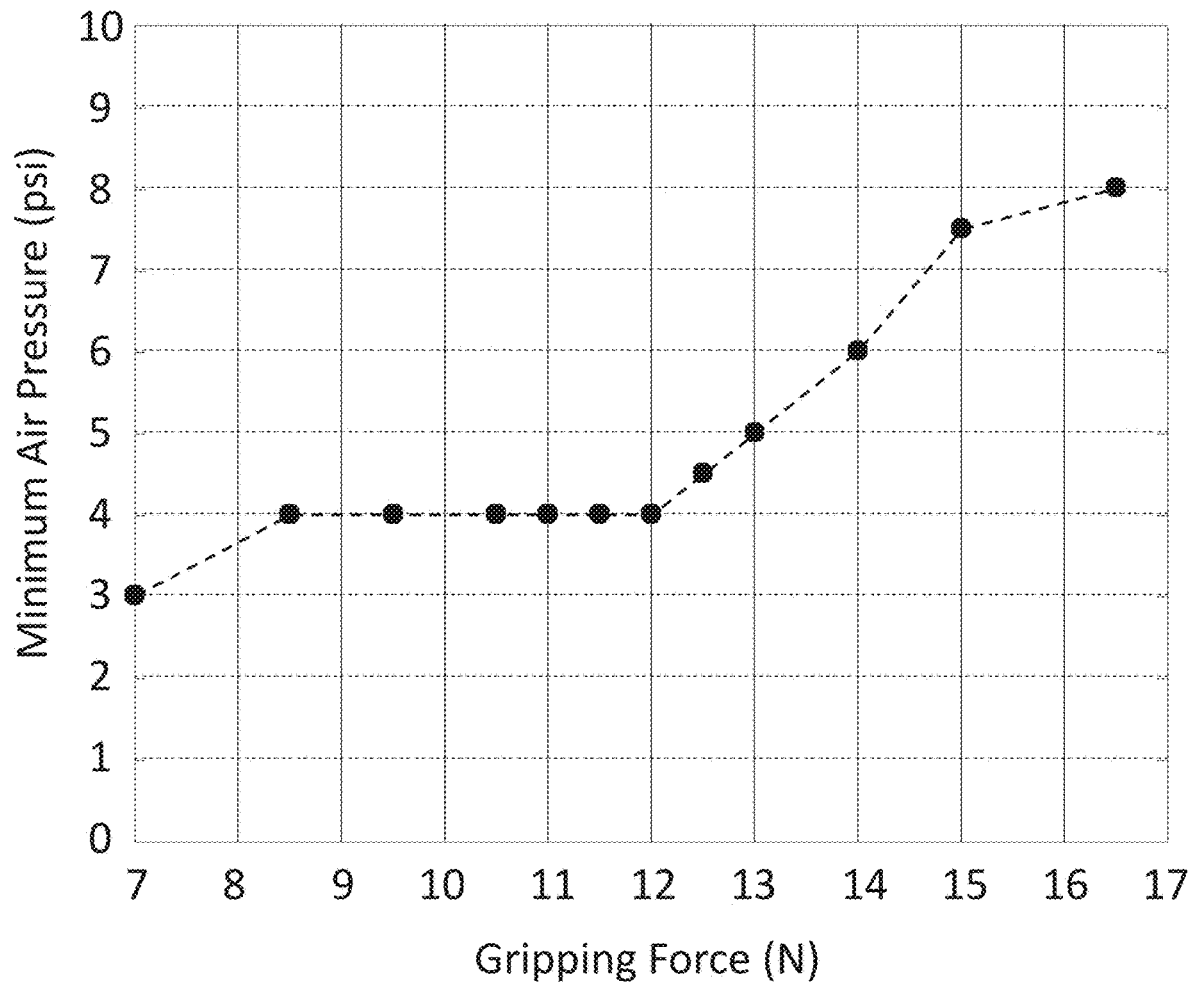
FIG. 11 is a graph showing experimental results of measured minimum air pressure versus a particular gripping force for one embodiment of a finger.

FIG. 11 is a graph showing experimental results of measured minimum air pressure versus a particular gripping force. This experiment was performed to empirically characterize the relationship between air pressure applied to the flexible membrane and gripping force. Such a characterization is informative of finger performance, as the experimental data is reliable and convenient due to the robustness and repeatability of the functionality of the fingers. The characterization of the fingers may be beneficial to understand the expected performance when manipulating objects of different sizes and weights and in different use conditions. In some cases, if sufficient gripping force is not applied, the object may slip out of the grasp during pivoting. In contrast, if more than a suitable gripping force is applied, torsional resistance may inhibit the object from pivoting to a vertical position. Similarly, if the pressure applied inside the fingers is insufficient, the fingers may not maintain an extended state geometry and a contact with the object may change shape, thereby inhibiting the object from pivoting to the vertical position.

To record the experimental results shown in FIG. 11, multiple runs of a pivoting phase of object grasping were carried out by changing the gripping force and air pressure in every run. For each gripping force applied, different air pressures were applied to a flexible membrane of the fingers to maintain a wedge shape in an extended state during the pivoting phase. During the experimental runs, the pressure threshold below which the object no longer pivoted to the vertical position due to the change in shape of the fingers was recorded, the result of which are shown in FIG. 11.

Without wishing to be bound by theory, the contact geometry may play a role in governing the motion at contacts between an object and fingers of a gripper. In some embodiments, the geometry of the contacts of the fingers is dependent on pressure inside of a flexible membrane and the gripping force applied to the fingers. Accordingly, to maintain a particular contact geometry (e.g., point or line) of the fingers for successful pivoting for different gripping forces, pressure inside the membrane may be varied. If the pressure inside the membrane is higher than a suitable pressure, it may not affect the functionality of the gripper adversely as the wedge-shaped geometry will still be maintained. However, if the pressure is lower than a suitable pressure, the geometry may not be maintained and pivoting performance may be degraded. For example, if in the extended state the contact has a line or point geometry, a lower than suitable pressure may cause the contact to flatten and provide a relatively large contact area with high torsional resistance. Accordingly, in this example a grasped object may not be able to pivot sufficiently due to the large torsional resistance.

As shown in FIG. 11, a relationship between an exemplary minimum air pressure for maintaining a contact geometry of a flexible membrane and gripping force is shown. The trend observed in FIG. 11 may be intuitive from a force balance relationship between the gripping force and air pressure. That is, to resist a higher gripping force, the pressure inside the flexible membrane may be correspondingly increased. As shown in FIG. 11, there may be a minimal difference in the minimum air pressure for low gripping forces. It is possible the lack of difference for low gripping forces is a result of the pressure regulator employed during the experiment which was able to measure and control pressure with a resolution of 0.5 psi. From these results shown in FIG. 11, any air pressure higher than the recorded minimum pressure may be suitable for grasping and pivoting an object.

It should be noted that the results shown in FIGS. 10 and 11 are exemplary and are only directly applicable to the specific experimental setup employed. In some cases, the minimum air pressure values recorded in FIG. 11 may be applicable for any object using the experimental finger design. However, the relationship shown in FIG. 10 between the grasp offset and maximum grip force may be dependent on the weight of the object. Accordingly the results in FIG. 10 may only be applicable for a specific object and the experiment may be conducted again to characterize other objects.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

What is claimed is:

1. A gripper comprising:
   two gripper fingers, each of the gripper fingers comprising:
   a flexible membrane that forms at least a portion of a cavity, wherein the flexible membrane is moveable between an extended state and a retracted state in response to a pressure applied to the cavity; and
   a contact disposed on the flexible membrane, wherein the contact is configured to contact an object when the flexible membrane is in the extended state,
   wherein the contacts are configured such that the object pivots about the contacts when the contacts are in contact with the object and when the object is lifted by the gripper.

2. The gripper of claim 1, further comprising a pressure source in fluid communication with the cavity, wherein the pressure source is configured to increase the pressure in the cavity to move the flexible membrane to the extended state.

3. The gripper of claim 2, wherein the pressure source is configured to reduce the pressure in the cavity to move the flexible membrane to the retracted state.

4. The gripper of claim 3, wherein reducing the pressure applies a vacuum to the flexible membrane to move the flexible membrane to the retracted state.

5. The gripper of claim 1, wherein in the retracted state the flexible membrane forms a V-shaped channel.

6. The gripper of claim 5, wherein in the retracted state the flexible membrane is in contact with the object and the contact is out of contact with the object.

7. The gripper of claim 1, wherein the contact forms a point or a line.

8. The gripper of claim 1, wherein in the extended state the flexible membrane is wedge shaped.

9. The gripper of claim 1, wherein the object is a cylindrical object.

10. The gripper of claim 1, wherein the pressure is applied by air.

11. The gripper of claim 1, wherein when the contacts are in contact with the object the contacts form a pivot axis for the object.

12. A method for operating a gripper, the method comprising:
   placing two gripper fingers adjacent an object;
   applying a pressure to a flexible membrane of each gripper finger to move the flexible membrane of each finger to an extended state where a contact of each finger is in contact with the object; and
   lifting the object to pivot the object about the contacts.

13. The method of claim 12, further comprising reducing the pressure applied to the flexible membrane of each finger to move the flexible membrane of each finger to a retracted state.

14. The method of claim 13, wherein in the retracted state the flexible membrane forms a V-shaped channel.

15. The method of claim 14, wherein in the retracted state the flexible membrane is in contact with the object and the contact is out of contact with the object.

16. The method of claim 13, wherein reducing the pressure applies a vacuum to the flexible membrane to move the flexible membrane to the retracted state.

17. The method of claim 12, wherein the contact forms a point or a line.

18. The method of claim 12, wherein in the extended state the flexible membrane is wedge shaped.

19. The method of claim 12, wherein the object is a cylindrical object.

20. The method of claim 12, wherein the pressure is applied by air.

21. The method of claim 12, wherein when the contacts are in contact with the object they form a pivot axis for the object.

22. A method of reorienting an object, the method comprising:
   placing two fingers of a gripper adjacent an object supported by a support;
   extending a contact of each finger to an extended state;
   displacing the two fingers toward one another such that the contact of each finger forms a point contact with the object, wherein a center of gravity of the object is offset from between the two point contacts;
   displacing the gripper to remove the object from the support such that the object reorients under a force of gravity to a desired orientation; and
   retracting the contact of each finger to a retracted state.

23. The method of claim 22, wherein the desired orientation is a vertical orientation.

24. The method of claim 22, wherein the contact of each finger is disposed on a flexible membrane that forms at least a portion of a cavity, wherein the flexible membrane is moveable between the extended state and the retracted state.

25. The method of claim 24, wherein the flexible membrane of each finger is configured to move in response to a pressure applied to the cavity.

26. The method of claim 24, wherein in the retracted state the flexible membrane forms a V-shaped channel.

27. The method of claim 24, wherein in the extended state the flexible membrane is wedge shaped.

28. The method of claim 22, wherein when the contacts are in contact with the object they form a pivot axis for the object.

29. The method of claim 22, wherein movement of the contact of each finger between the extended state and the retracted state is independently controlled relative to movement of each finger.

* * * * *